United States Patent [19]

Miller

[11] Patent Number: 5,311,008
[45] Date of Patent: May 10, 1994

[54] SELF-ELECTROOPTIC EFFECT DEVICE FOR PROVIDING INTEGER GAIN TO INPUT OPTICAL SIGNALS HAVING SERIES CONNECTED QUANTUM WELL DIODES

[75] Inventor: David A. B. Miller, Fair Haven, N.J.

[73] Assignee: AT&T Bell Laboratories, Murray Hill, N.J.

[21] Appl. No.: 997,384

[22] Filed: Dec. 28, 1992

[51] Int. Cl.$^5$ .............................................. H01J 40/14
[52] U.S. Cl. ................................ 250/214 LS; 377/102
[58] Field of Search ................. 250/214 LS, 214 LA, 250/214 R; 377/102; 257/21, 22, 17, 18

[56] References Cited

U.S. PATENT DOCUMENTS

| | | | |
|---|---|---|---|
| 4,546,244 | 10/1985 | Miller . | |
| 4,751,378 | 6/1988 | Hinton et al. . | |
| 4,754,132 | 6/1988 | Hinton et al. . | |
| 5,030,831 | 7/1991 | Coon et al. | 257/21 |
| 5,093,565 | 3/1992 | Lentine | 250/214 LS |

OTHER PUBLICATIONS

Miller, D. A. B., "Quantum-Well Self-Electro-Optic Effect Devices", *Optical & Quantum Electronics*, vol. 22, 1990, pp. S61-S98.
Trabka, E. A. et al., "Image Transformations for Pattern Recognition Using Incoherent . . . ", *Jrnl Optical Society Amer.*, vol. 54, No. 10, Oct. 1964, pp. 1242-1252.

*Primary Examiner*—David C. Nelms
*Assistant Examiner*—Que T. Le
*Attorney, Agent, or Firm*—Gerard A. deBlasi

[57] ABSTRACT

Enhanced optical information processing capability is achieved by providing a self-electrooptic effect device (SEED) which modulates one or more power supply beams to provide integer gain in an input optical signal. This "integer gain" SEED includes a predetermined number of quantum well diodes electrically connected in series with a current supply so that, at steady state, each quantum well diode conducts the same current and thus absorbs the same amount of optical power. An optical input signal is replicated by configuring the quantum well diodes such that each quantum well diode receives its own power supply beam. The optical input signal is amplified by configuring the quantum well diodes such that a single power supply beam passes through all of the quantum well diodes.

23 Claims, 9 Drawing Sheets

FIG. 4

| DIODE NUMBER, $m$ | TRANSMISSIVE | | REFLECTIVE | |
|---|---|---|---|---|
| | PEAK ABSORBANCE, $G_m$ | LAYER THICKNESS, $d_m\ (\mu m)$ | PEAK ABSORBANCE, $G_m$ | LAYER THICKNESS, $d_m\ (\mu m)$ |
| 1 | 1.179 | 2.357 | 0.349 | 0.697 |
| 2 | 0.526 | 1.052 | 0.313 | 0.627 |
| 3 | 0.343 | 0.686 | 0.266 | 0.532 |
| 4 | 0.255 | 0.510 | 0.223 | 0.446 |

SELF-ELECTROOPTIC EFFECT DEVICE FOR PROVIDING INTEGER GAIN TO INPUT OPTICAL SIGNALS HAVING SERIES CONNECTED QUANTUM WELL DIODES

TECHNICAL FIELD

This invention relates to optical devices and, more particularly, to optical devices which utilize the self-electrooptic effect.

BACKGROUND OF THE INVENTION

The use of optics and optical devices in fields such as communications and computing has created a need for optical devices which increase the power gain of optical signals. Also, the complexity of the processing required in these fields makes it desirable, and even necessary, to exactly replicate optical signals so that these signals can be processed in parallel and without significant power loss.

One technique for increasing the power of an optical signal is to amplify the optical signal using a phototransistor. However, phototransistors require careful manufacturing controls. In particular, it is difficult to obtain an array of phototransistors with gain characteristics within acceptable tolerances for amplifying an entire image at the same amplification characteristics.

Replicas of optical signals can be created using beam splitters. However, beam splitters often are less than perfectly manufactured and thus may create unequal reflected and transmitted images. Moreover, use of a beam splitter to create a replica of an optical signal reduces the power of the created replicas because the power in the original signal is divided among the replicas. This reduced power may be insufficient to allow high-speed parallel processing of the optical signals.

SUMMARY OF THE INVENTION

Enhanced optical information processing capability is achieved by providing a SEED device which modulates one or more power supply beams to provide integer gain in an input optical signal. This "integer gain" SEED can be configured either to replicate or to amplify the input optical signal.

In an exemplary embodiment of the invention, a predetermined number of quantum well diodes are electrically connected in series with a current supply so that, at steady state, each quantum well diode conducts exactly the same current and thus absorbs exactly the same amount of optical power (assuming substantially identical diode construction). An optical input signal is replicated by configuring the quantum well diodes such that each quantum well diode receives its own power supply beam. The optical input signal is amplified by configuring the quantum well diodes such that a single power supply beam passes through all of the quantum well diodes.

BRIEF DESCRIPTION OF THE DRAWINGS

In the drawings:

FIG. 4 is a table showing characteristics of the integer gain SEEDS of FIGS. 2 and 3;

DETAILED DESCRIPTION

Figure 1:
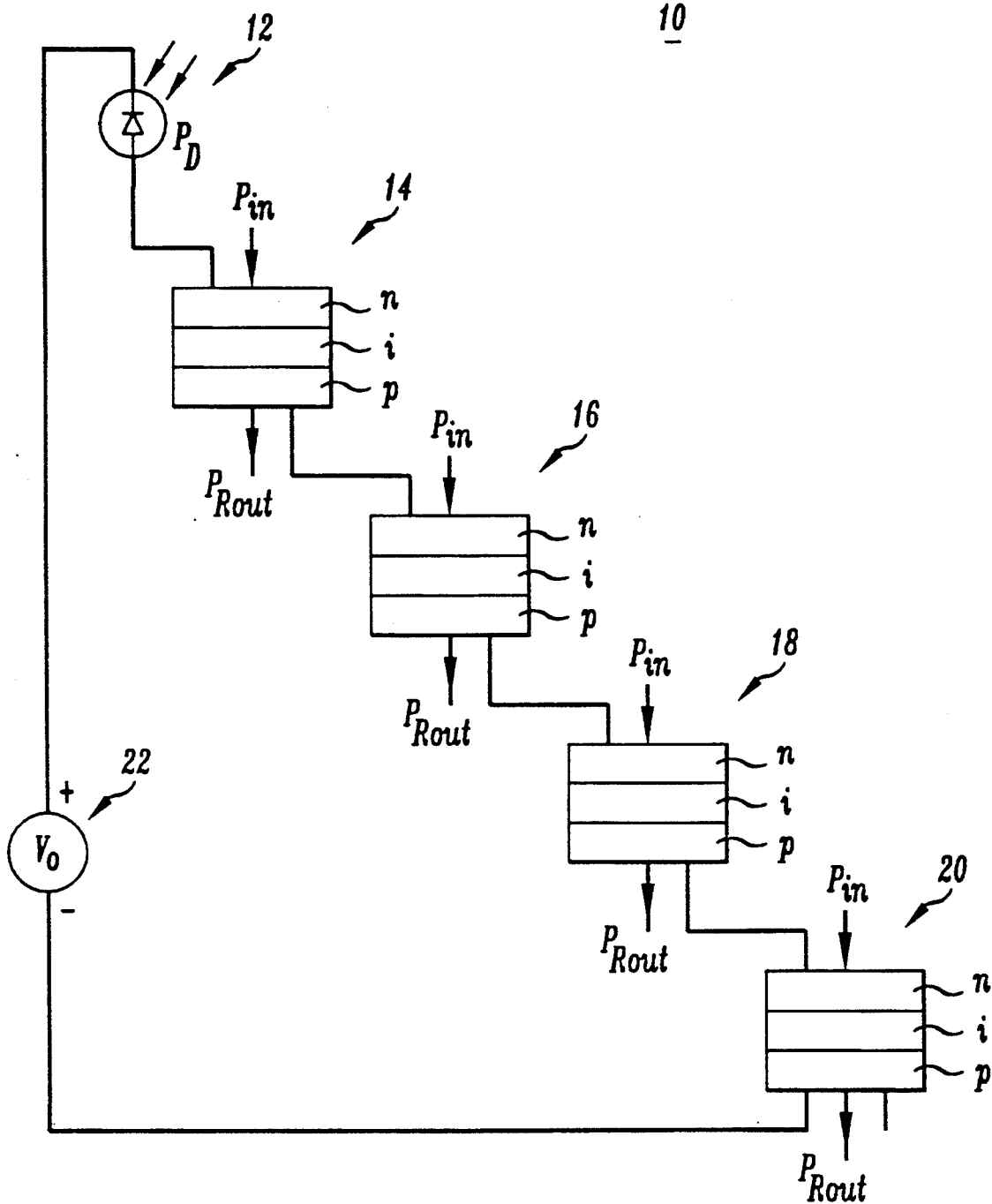
FIG. 1 is a schematic diagram of an illustrative integer gain SEED, for creating replicas of an optical signal, that is constructed in accordance with the principles of the present invention.

To establish a foundation for the teachings of my invention, a brief review of the structure and operation of self-electrooptic effect devices (SEEDs) will be presented prior to describing the details of the invention.

Quantum well SEEDs are a family of optoelectronic devices that operate based on the large electroabsorptive mechanisms seen in layered semiconductor structures. These devices are described in detail, for example, in U.S. Pat. Nos. 4,546,244, 4,751,378, and 4,754,132. A conventional SEED includes a GaAs/AlGaAs p-i-n photodiode having one or more quantum well layers in the intrinsic (i) region of the photodiode (hereafter referred to as a quantum well diode). The quantum well diode is coupled to a current source which reverse biases the diode. In practice, quantum well diodes are constructed such that, over a range of reverse bias, exactly one electron of photocurrent flows for each photon absorbed in the intrinsic region of the diode.

The amount of optical power absorbed by a quantum well diode, and the amount of photocurrent generated by the diode, depends on the voltage across the diode. (The photon energy of the light beam is chosen such that the diode absorption and photocurrent increase with increasing voltage.) The photocurrent, in turn, will change the voltage across the quantum well diode according to the external circuit through which the photocurrent passes. When the external circuit has the characteristic that the current through it is substantially independent of the voltage across it (a so-called "constant current source") this creates a feedback mechanism referred to as "self-linearized modulation."

In self-linearized modulation, the voltage across the quantum well diode adjusts itself so that the generated photocurrent is exactly equal to the current from the current source. If the diode is generating too much photocurrent, there would be a net current that would act to discharge the capacitance of the quantum well diode, decreasing the voltage across the diode and thus reducing the absorption of the diode. Conversely, if the quantum well diode is generating too little photocurrent, the voltage across the diode increases, causing absorption to increase. Consequently, in the steady state, the power $P_A$ absorbed by the quantum well diode is linearly proportional to the current $I_C$ flowing through the diode, according to the expression $$P_A = \frac{\omega}{e} I_c,$$

where $\omega$ is the photon energy and e is the electronic charge. Self-linearized modulation is described in U.S. Pat. No. 4,546,244, which is hereby incorporated by reference.

I have recognized that an arbitrary number of quantum well diodes can be placed in series with a current supply so that, at steady state, each quantum well diode conducts exactly the same current and thus absorbs exactly the same amount of optical power. When the current supply is an input photodiode, this novel SEED arrangement can be used to modulate one or more power supply beams to provide an integer gain in an input optical signal. I have recognized that this "integer gain" SEED can be configured either to replicate or to amplify the input optical signal.

FIG. 1 shows an integer gain SEED 10 configured to replicate an input optical signal. Integer gain SEED 10 (also referred to as a "replicating SEED") includes an input photodiode 12, and four substantially identical quantum well diodes 14, 16, 18, and 20. Photodiode 12 and the quantum well diodes are connected in series with and are reverse biased by a voltage source 22. An input optical signal $P_D$ strikes photodiode 12, which generates a photocurrent $I_C$ that flows through each of the quantum well diodes and controls the absorption characteristics of those diodes. Each quantum well diode receives a power supply beam $P_{in}$ and outputs an optical signal $P_{Rout}$. Because the current $I_C$ flowing through the quantum well diodes is proportional to the optical power absorbed by the input photodiode, each quantum well diode will absorb optical power in an amount proportional to the power absorbed by input photodiode 12. Preferably, each of the quantum well diodes absorbs one photon of light for each electron that passes through it. This produces an absorbed power in each quantum well diode that is proportional to the optical power of the input signal. In the case where the photon energies of beams $P_D$ and $P_{in}$ are identical and where photodiode 12 passes one electron of current for each photon incident on it, the power absorbed by each quantum well diode is equal to the optical power of the input signal $P_D$. In this manner, replicating SEED 10 creates four exact inverted copies of the optical signal $P_D$ at the output of the quantum well diodes. $P_{Rout}$ is an exact inverted replica of $P_D$, which can be used, for example, to perform parallel information processing operations on $P_D$.

Figure 2:
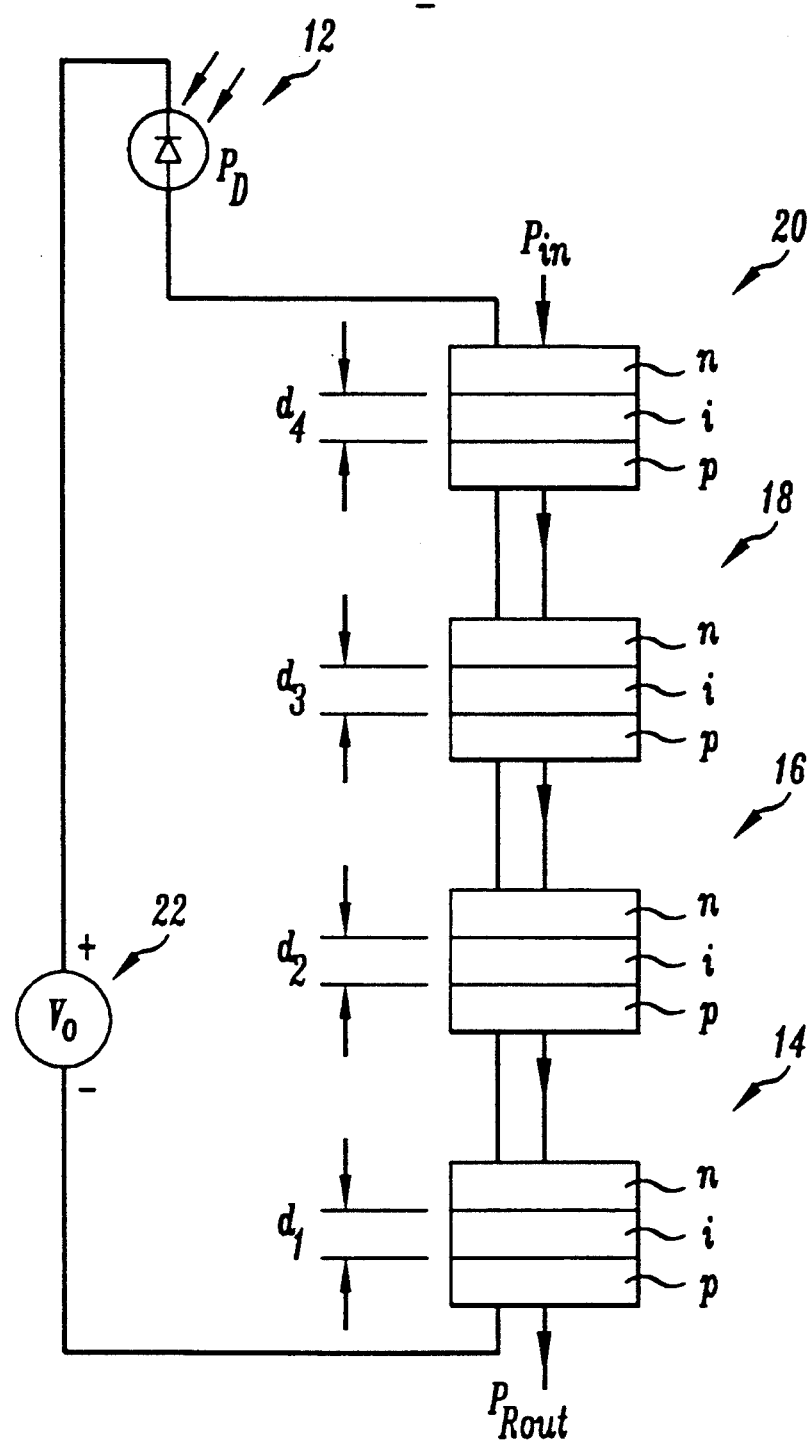
FIG. 2 is a schematic diagram of an illustrative integer gain SEED, for amplifying an optical signal, that is constructed in accordance with the principles of the present invention.

FIG. 2 shows an integer gain SEED 24 which is configured to amplify the input signal $P_D$ that is received at input photodiode 12. Integer gain SEED 24 includes the same elements as replicating SEED 10, but quantum well diodes 12, 16, 18, and 20 are configured in a "stacked" arrangement, such that a single power supply beam $P_{in}$ passes through each of the quantum well diodes. Specifically, $P_{in}$ enters quantum well diode 20 and exits from quantum well diode 14 as $P_{Sout}$. Each quantum well diode absorbs optical power in an amount proportional to the power absorbed by photodiode 12. In a preferred embodiment, each quantum well diode absorbs optical power in an amount equal to the power absorbed by photodiode 12, so the difference between $P_{in}$ and $P_{Sout}$ (i.e., the total power absorbed by the quantum well diodes) is an integer multiple of optical power absorbed by photodiode 12, thereby providing an integer gain.

Figure 3:
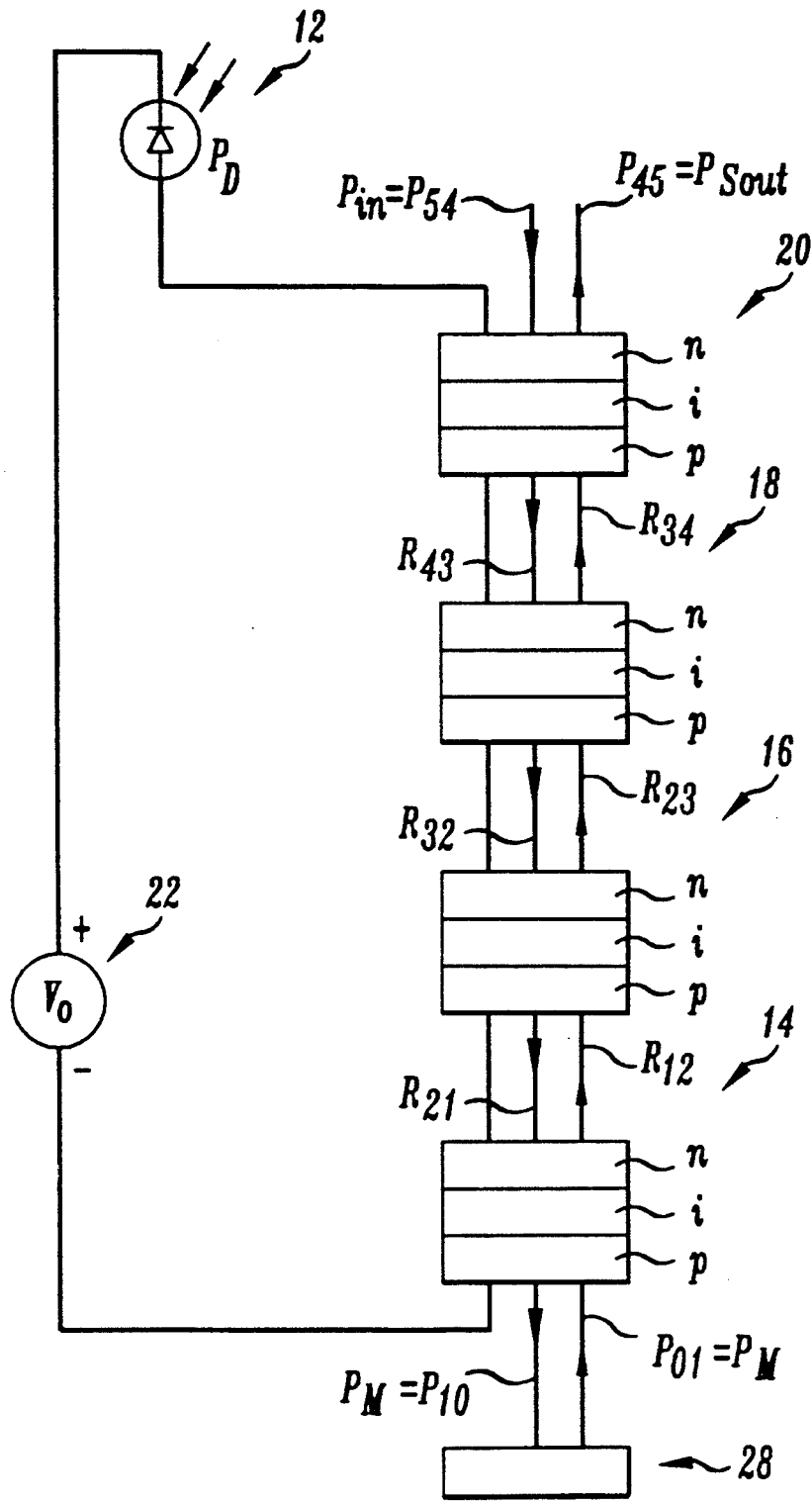
FIG. 3 is a schematic diagram of an alternative embodiment of the integer gain SEED of FIG. 2.

FIG. 3 shows an alternative embodiment of the stacked SEED of FIG. 2 in which a power supply beam passes through each of the quantum well diodes twice. Specifically, in the "reflective" stacked SEED 26 of FIG. 3, a power beam $P_{in}$ enters quantum well diode 20 and passes through quantum well diodes 18, 16, and 14, to strike a mirror 28. The beam is reflected from mirror 28 and again passes through the stack of quantum well diodes to exit quantum well diode 20 as $P_{Sout}$. Beam $P_{Sout}$ shows an integer gain of four over the input signal $P_D$ received by input photodiode 12.

The output power from the stacked SEEDs of FIGS. 2 and 3 is given explicitly by $P_{Sout} = P_{in} - nP_D$, where the optical signal gain has a value of n.

The layer thicknesses of the stacked SEEDs of FIGS. 2 and 3 are selected to ensure that preceding quantum well diodes do not absorb so much power that there is insufficient power transmitted to the next quantum well diode to allow it to generate enough photocurrent. One technique for designing a stacked seed is to select layer thicknesses so that at a particular absorption coefficient all diodes have the same absorption. The absorption coefficient, at a given wavelength, is a function only of the field. Hence, there is a set of conditions for which the field is the same in all quantum well diodes. Selecting the largest absorption coefficient allowed will minimize the total thickness of absorbing material required to achieve a given minimum transmission or reflectivity. This absorption coefficient will correspond to the largest field allowed, since the absorption coefficient should increase with field.

In designing a transmissive stacked SEED, such as the SEED of FIG. 2, the number of diodes n (i.e., the desired gain) and the desired minimum total transmission $T_{min}$ of the SEED are first selected. Because each quantum well diode absorbs optical power in an amount equal to the input signal power $P_D$, the minimum transmission case is given by the expression $$n \frac{P_{Dmax}}{P_{in}} = (1 - T_{min}),$$

where $P_{Dmax}$ is the incident power on diode 12 that will result in the minimum transmission for a given $T_{min}$. For any layer m, with incident power $P_{inm}$, the thickness $d_m$ of that layer is given by the expression $$d_m = \frac{1}{a_{max}} \log\left( \frac{n - (n - m)(1 - T_{min})}{n - (n - m + 1)(1 - T_{min})} \right).$$

In designing a reflecting stacked SEED, such as the SEED of FIG. 3, one must consider that the power absorbed in a given quantum well diode is the sum of the power absorbed from both the initial and reflected beams. As described with reference to FIG. 3, a reflecting stacked SEED can be analyzed by starting from the mirror and working upwards through the quantum well diodes. First, an absorbance is selected for the bottom diode (i.e., quantum well diode 14 of FIG. 3). Next, the absorption thicknesses for the other quantum well diodes are determined. Finally, the minimum reflectivity $R_{min}$ is determined. In this case, an absorbance of $a_{max}d_1$ is selected for diode 14, where $d_1$ is the thickness of the diode. The power absorbed by any diode is always equal to $P_D$ when the quantum well diodes are in their self-linearized region, so we have for the maximum absorption case $$P_{Dmax} = (P_{m+1m} + P_{m-1m})(1 - e^{\alpha_{max}d_m})$$

The layer thickness $d_m$ in terms of the powers below layer m are given by $$d_m = \frac{1}{\alpha_{max}} \log \left[ 2P_{m-1m} \left( (P_{Dmax} + P_{mm-1} - P_{m-1m}) \left( \sqrt{1 + \frac{4P_{m-1m}P_{mm-1}}{(P_{Dmax} + P_{mm-1} - P_{m-1m})}} - 1 \right) \right)^{-1} \right].$$

Solving from the bottom of the structure, $P_{Dmax}$ is deduced for layer 1, followed by the powers for each higher layer.

FIG. 4 shows a table indicating the peak absorbance and layer thicknesses for exemplary designs of both transmissive and reflective stacked SEEDs having four quantum well diodes. The peak absorbance $G_m$ in FIG. 4 is equal to $\alpha_{max}d_m$, where $\alpha_{max}$ is the peak absorption coefficient that will be used at the operating wavelength in the material. The values are calculated for a minimum transmission or reflection of 0.1, and assume a peak absorption coefficient of 5000 cm$^{-1}$.

FIG. 4 shows that, in the transmissive stacked SEED, the layers must become significantly thicker moving from the input quantum well diode 20 to the output quantum well diode 14. This occurs because the optical power incident on the quantum well diodes nearer to the output, i.e., diode 14, is significantly reduced by the absorption in the preceding quantum well diodes. Thus, the absorbance in the subsequent diodes must be higher to achieve the same absorbed power.

In contrast to the transmissive SEED, the layers thicknesses in the reflective SEED are more similar to one another, because there is a compensation between the powers in the beams traveling in the two directions through the SEED. The "forward" incident power $P_{54}$ on quantum well diode 20, for example, is large because it is as yet unattenuated. The "backward" incident power $P_{34}$, however, is highly attenuated. Thus, the total incident powers on all the quantum well diodes tend to be more nearly similar in the reflective case.

Figure 5:
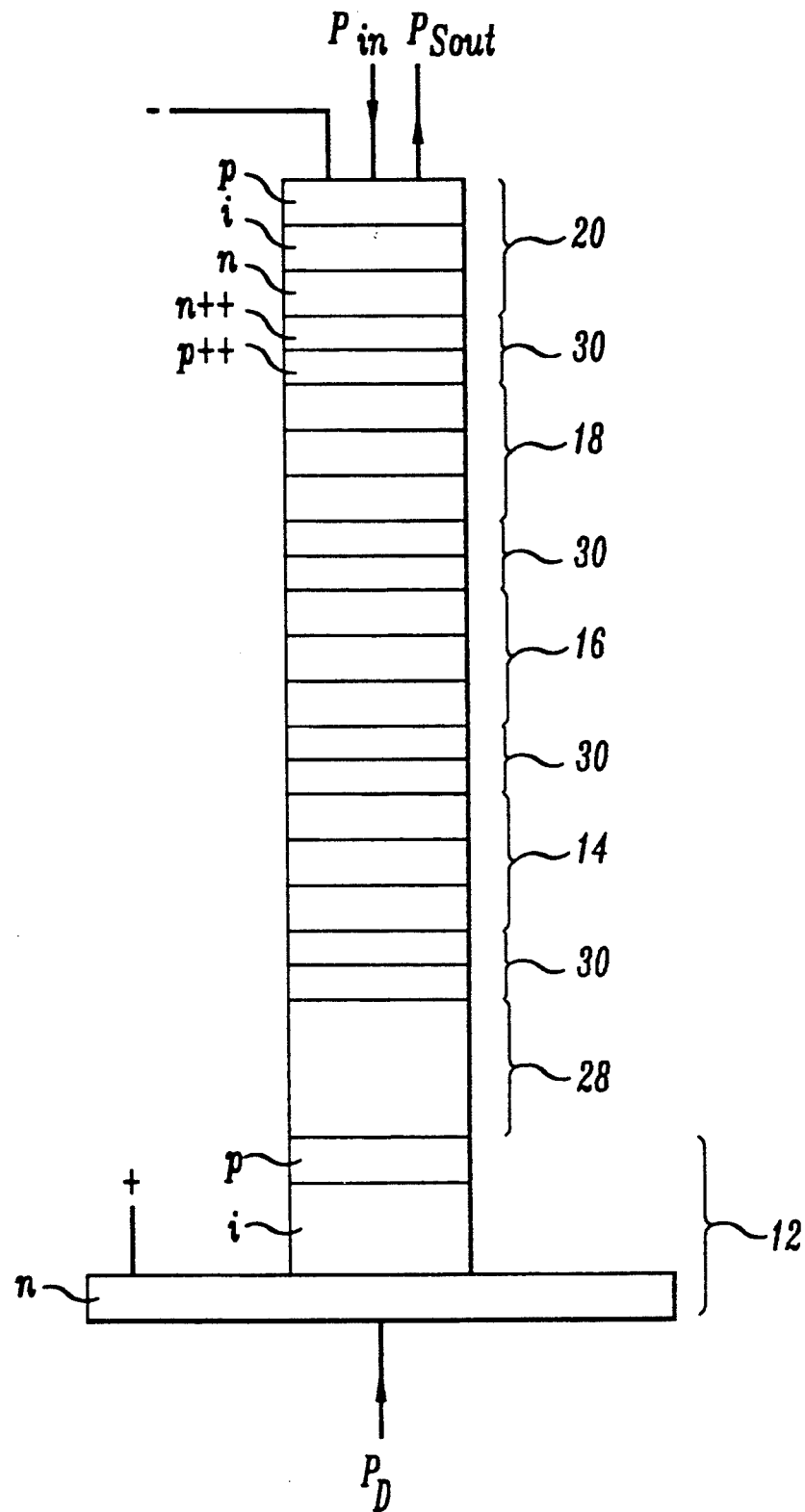
FIG. 5 is an exemplary cross-sectional diagram of the integer gain SEED of FIG. 3.

FIG. 5 shows an exemplary structure for the reflective stacked SEED of FIG. 3 in which quantum well diodes are grown on top of one another. Quantum well diodes 14, 16, 18, and 20 are separated from one another by tunnel junction diodes 30. Tunnel diodes 30 form a tunnel junction between adjacent quantum well diodes that minimizes undesirable parasitic bipolar transistors that can result from the various n-p-i-n and p-n-i-p structures. The tunnel junction prevents minority carrier injection into the base of a transistor from the emitter of the transistor. Fabrication of the tunnel junction is described in further detail in Miller et al., "Integrated Quantum Well Self-Electro-Optic Effect Device: No. 2×2 Array of Optionally Bistable Switches," Appl. Phys. Lett., Vol. 49, (1986) pp. 821-23, which is hereby incorporated by reference.

The structure of FIG. 5 can be used to form an array of devices with an input image on one side and an amplified output image on the other side. The structure produces an inverted version of the input image pixel at the output, amplified by the integer gain of the structure, which is equal to the number of quantum well diodes in the stack. Photodiode 12 receives a pixel of the input image in the form of an input beam $P_d$, which strikes photodiode 12 from the bottom of the stack. Simultaneously, power supply beam $P_{in}$ strikes quantum well diode 20 at the top of the stack. The optical power of the input pixel is absorbed in the intrinsic region of photodiode 12. $P_{in}$ passes through the stack of quantum well diodes and is reflected from dielectric stack mirror 28, which is designed to reflect the wavelength (or a predetermined range of wavelengths including the wavelength of beam $P_{in}$) of power beam $P_{in}$. $P_{in}$ then passes back through the quantum well diodes, and the inverted, amplified output $P_{Sout}$ emerges from the top of the stack.

If the stack structure of FIG. 5 includes a relatively large number of quantum well diodes, it is possible to run the entire device without any electrical power supply. To do this the top of the quantum well diode stack (i.e., the "−" terminal) directly to the bottom of conventional diode 12 (the "+" terminal). This self-biased operation takes advantage of the built-in voltage in the diodes. For thin intrinsic regions, as would be appropriate for a high gain device with many diodes, this voltage can be large enough to provide a sufficient bias field for the quantum wells. When light is shined on the quantum wells, the quantum wells will be forward biased, collectively generating enough reverse bias to put photodiode 12 into its operating region. Such an arrangement would allow an optoelectronic image amplifier with no electrical power supply.

Although the invention has been described with reference to an integrated stacked structure, one skilled in the art will appreciate that the stacked integer gain SEEDs of the invention could be constructed in a variety of ways without departing from the scope of the invention. For example, the stacked SEEDs could be constructed using many separate quantum well diodes, or by using an optical scheme that passes the same beam sequentially through many series-connected diodes in a planar array.

The integer gain features of the present invention can be advantageously combined with the features of a differential SEED to create "differential integer gain" SEEDs. Differential SEEDs are described in commonly owned, co-pending U.S. patent application Ser. No. 07/997,414, filed concurrently herewith, entitled "Differential Self-Electrooptic Effect Device," which is hereby incorporated by reference.

Figure 6:
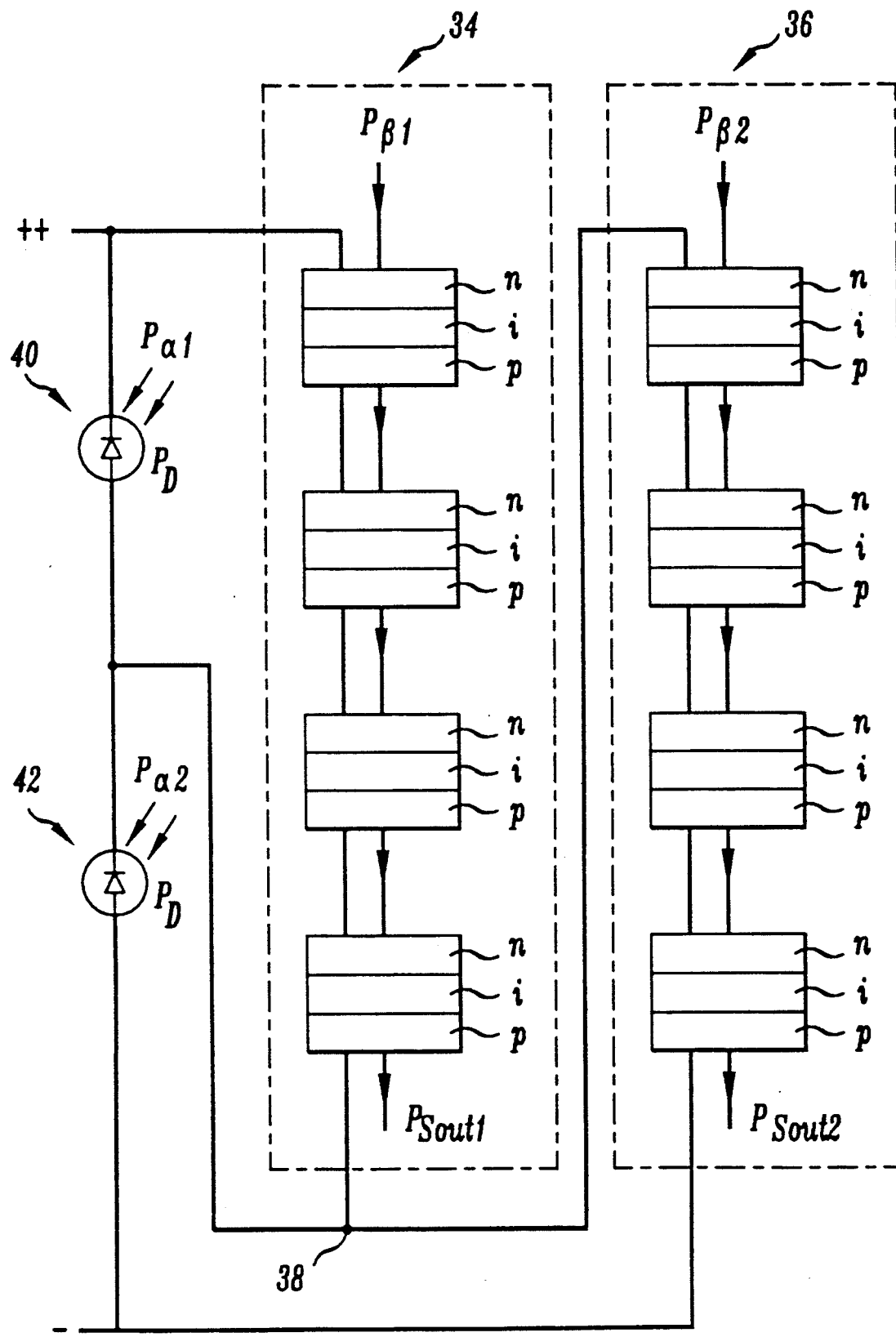
FIG. 6 is a schematic diagram of a differential integer gain SEED constructed in accordance with the principles of the invention.

FIG. 6 shows a differential stacked SEED 32 that is analogous to the transmissive stacked SEED of FIG. 2. Differential stacked SEED 32 includes two groups 34 and 36 of quantum well diodes. Each of groups 34 and 36 includes four quantum well diodes that are electrically connected in series and are configured such that a single light beam passes through all of the quantum well diodes within a given group. Groups 34 and 36 are electrically coupled to one another such that the difference between the optical power absorbed by group 34 and the optical power absorbed by group 36 is proportional to an electrical current $I_C$ flowing into a node 38 formed between groups 34 and 36. In this specific embodiment, the difference in absorbed powers is determined by the difference in the input powers absorbed by input photodiodes 40 and 42. Thus, the difference in the output powers $P_{Sout1}$ and $P_{Sout2}$ is an amplified version of the difference in the input power, with integer gain. (Which, in this case, is an integer gain of four). It is to be understood that a corresponding structure could be constructed for a differential reflecting stacked SEED, using an analysis similar to that described with respect to the reflecting stacked SEED of FIG. 3.

Figure 7:
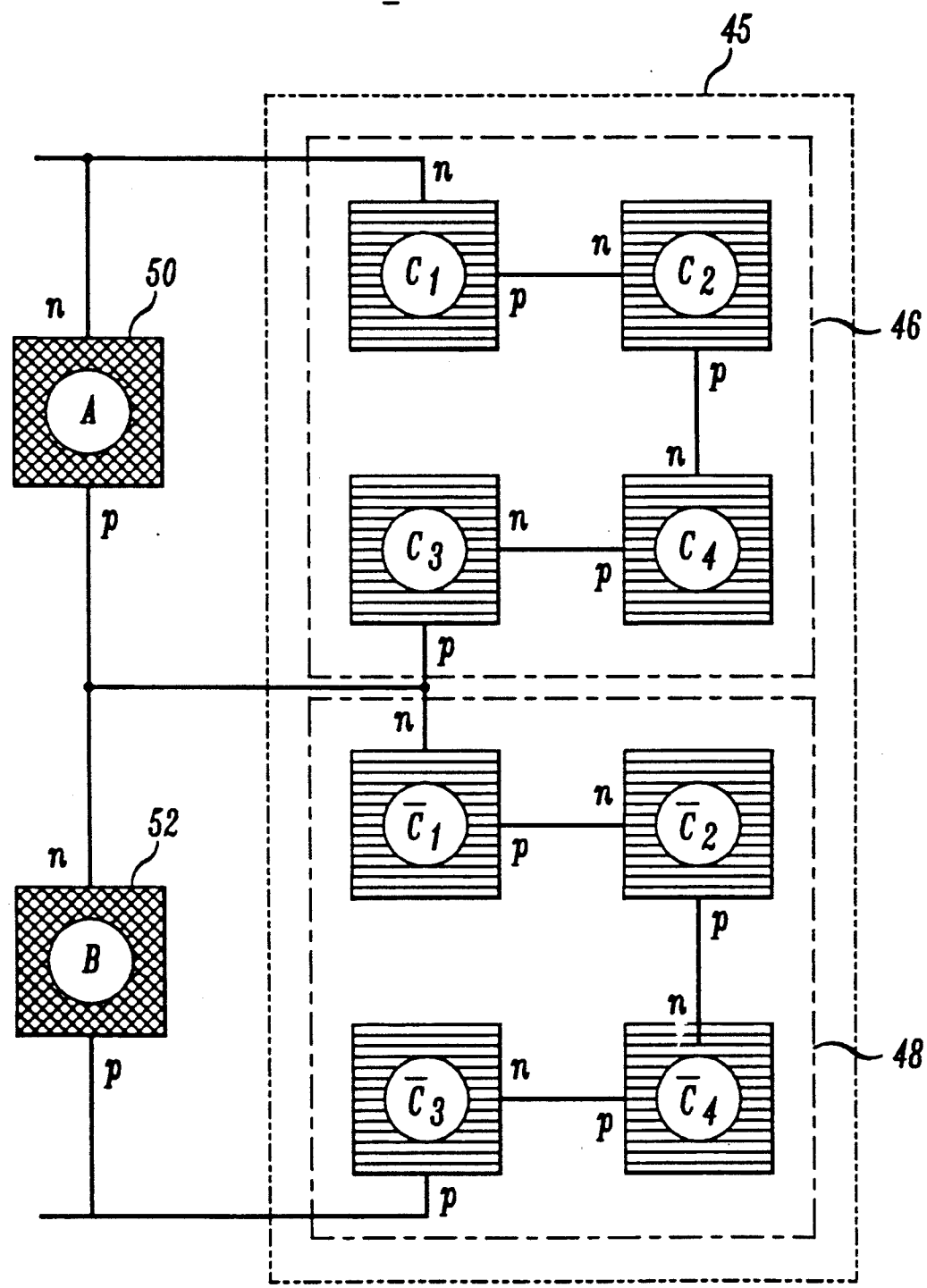
FIG. 7 is a plan view of a differential replicating integer gain SEED constructed in accordance with the principles of the invention.

FIG. 7 shows a plan view of a differential replicating SEED 44 that is analogous to the replicating SEED of FIG. 1. Differential replicating SEED 44, like the differential SEED of FIG. 6, includes an output stage 45 having two groups of quantum well diodes 46 and 48. The quantum well diodes within each of the two groups are electrically connected in series but are arranged such that individual power supply beams can be directed onto each of the quantum well diodes. Groups 46 and 48 are electrically coupled to one another and receive electrical current from input photodiodes 50 and 52. The difference in any pair of output beams $C_i$ and $\overline{C}_i$ equals the difference in the input beam powers A and B, assuming equal incident powers on all of the output diodes. This kind of circuit allows the result of an information processing operation to be "fanned out" and used to drive the inputs of many subsequent processing circuits with identical analog signals, thereby eliminating the need to rely on the accuracy of the splitting ratio of a beam splitter. The outputs of such a replicating circuit also are separated in space, enabling the use of simple optical techniques, such as patterned mirrors, to separate the output beams and direct them to a desired location.

Figure 8:
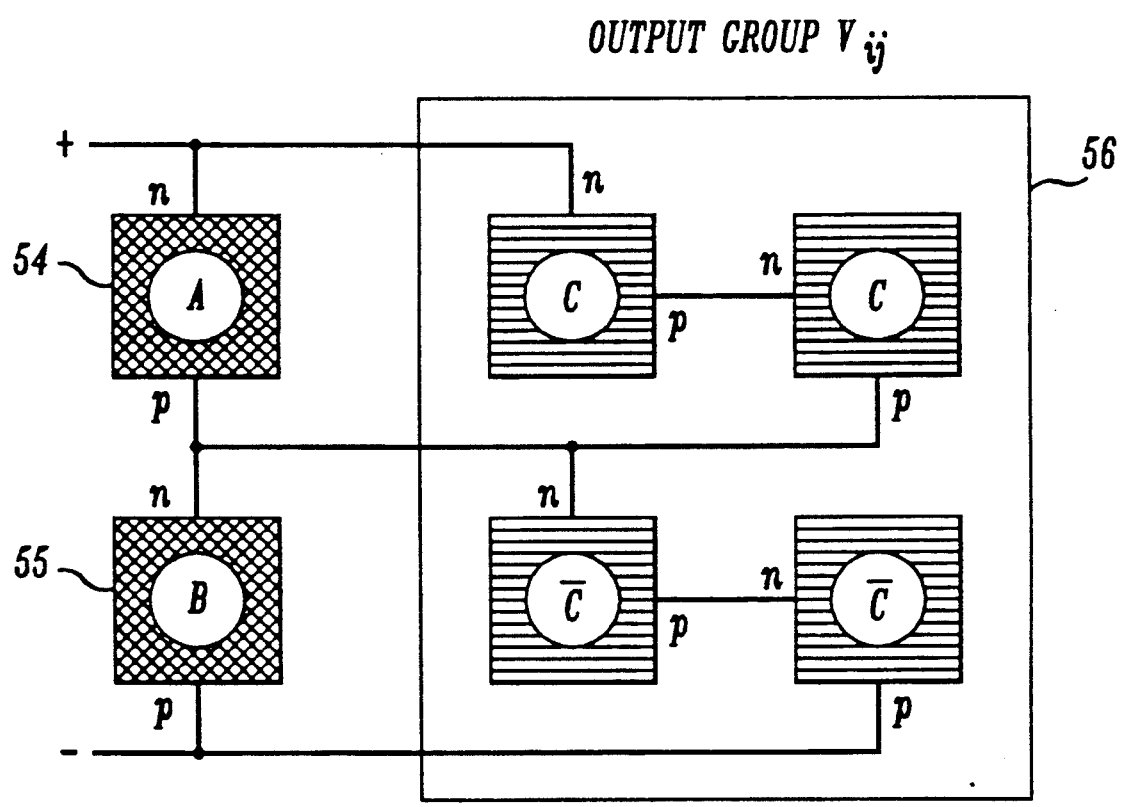
FIGS. 8 and 9 are plan views of a differential replicating integer gain SEED and a subsequent SEED processing stage, respectively, for evaluating a spatial derivative of a pixelated differential image.
Figure 9:
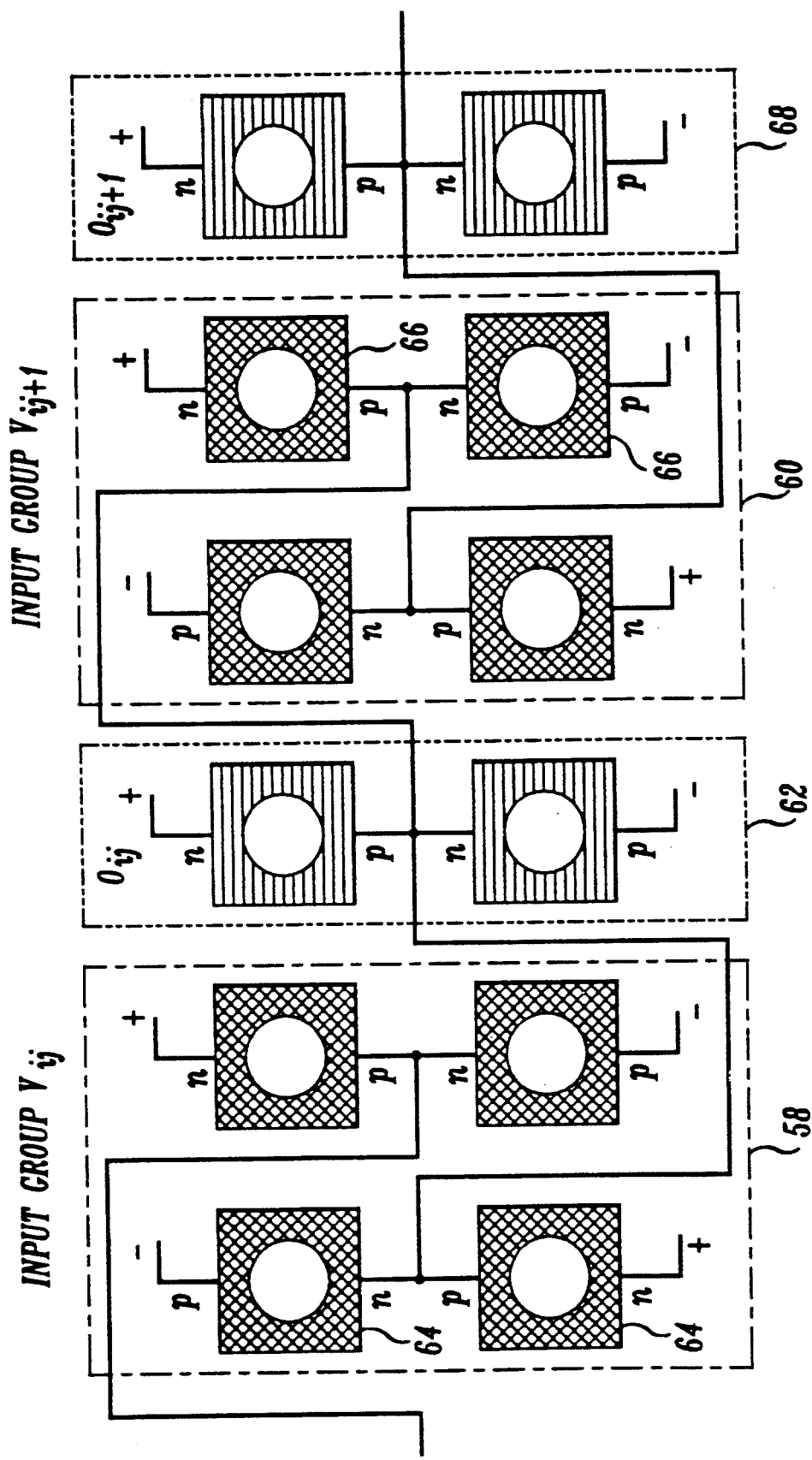

The differential replicated SEED of the present invention can be used to evaluate spatial derivatives and to perform correlations of pixelated images. FIGS. 8 and 9 show successive processing stages for taking the derivative of a pixelated image using a differential replicating SEED. These processing stages advantageously use the replicated beams to process pixelated images without the use of beam splitters. In particular, the circuits of FIGS. 8 and 9 evaluate the horizontal spatial derivative, or the difference between adjacent values in the x direction.

FIG. 8 shows a differential replicating SEED which receives a differential input at photodiodes 54 and 55. The pixels A and B from the differential input image are replicated to provide, at an output stage 56, data points that form an output group $V_{ij}$. Output group $V_{ij}$ from FIG. 8 becomes the input group $V_{ij}$ to an input stage 58 of FIG. 9. A second input group $V_{ij+1}$ of data points, that are received from another replicating SEED (not shown), strike a second input stage 60 of FIG. 9.

The circuit of FIG. 9 evaluates the spatial derivative of the pixelated image by controlling a pair of quantum well diodes 62 using electrical signals output from diodes within input groups 58 and 60. In particular, quantum well diodes 62 receive electrical signals from the diode pair 64 and the diode pair 66, which are spaced apart from one another. The differential outputs $O_{ij}$ from quantum well diodes 62 give the difference between the differential inputs $V_{ij}$ and $V_{ij+1}$. Similar connections are made from other input diode pairs to successive output stages, such as output stage 68, to evaluate spatial derivatives across the entire image.

The principles described with respect to FIGS. 8 and 9 can be extended to any kernel having a positive or negative integer weight. For example, in FIG. 9, one can obtain a negative weigh by changing the power supply connections to the input stages 58 and 60. To obtain a weight of $+m$, m replicas of the output from the previous stage are directed onto the same input photodiode pair. Thus, one can perform arbitrary convolutions of pixelated differential images, provided that the weights are positive or negative integers. Of course, it is within the scope of the present invention to handle other weights through the use of attenuators in the beam pairs.

It will be apparent to one skilled in the art that other modifications can be made to the described embodiment without departing from the scope of the invention.

I claim:

1. Semiconductor apparatus comprising:
   a plurality of quantum well diodes;
   means for directing an electrical current through each of said diodes in series, each quantum well diode being of a type which absorbs optical power from a light beam passing through it in an amount proportional to the electrical current; and
   means for varying the electrical current.

2. The invention of claim 1 wherein the quantum well diodes absorb a substantially equal amount of optical power.

3. The invention of claim 1 wherein the characteristic of each quantum well diode is such that substantially one photon is absorbed for each electron of current that flows therethrough.

4. The invention of claim 1 wherein the varying means comprises means responsive to optical signals.

5. The invention of claim 1 wherein the apparatus is configured in such a way that each quantum well diode receives a different respective one of a plurality of light beams.

6. The invention of claim 1 wherein the apparatus is configured in such a way that the plurality of quantum well diodes receive a single light beam that passes through all of the plurality of quantum well diodes.

7. The invention of claim 6 wherein the apparatus is configured in such a way that the light beam makes a single pass through the plurality of quantum well diodes.

8. The invention of claim 6 wherein the apparatus is configured in such a way that the light beam makes at least two passes through the plurality of quantum well diodes.

9. The invention of claim 8 further comprising a mirror disposed in the path of the light beam such that the light beam passes through the quantum well diodes and reflects from the mirror to again pass through the quantum well diodes.

10. Semiconductor apparatus comprising:
    first and second groups of quantum well diodes electrically coupled to each other, each of the first and second groups each including at least two quantum well diodes connected in series, each quantum well diode absorbing optical power from a light beam passing through the respective quantum well diode in an amount proportional to an electrical current flowing through the respective group of quantum well diodes; and
    means for supplying an electrical current at a node between the first and second groups of quantum well diodes, the difference between the optical power absorbed by the first group of quantum well diodes and the optical power absorbed by the second group of quantum well diodes being proportional to the electrical current supplied at the node.

11. The invention of claim 10 wherein the characteristic of each quantum well diode is such that substantially one photon is absorbed for each electron of current that flows therethrough.

12. The invention of claim 10 wherein the apparatus is configured in such a way that each quantum well diode receives a different respective one of a plurality of light beams.

13. The invention of claim 10 wherein the apparatus is configured in such a way that each of the first and second groups of quantum well diodes receive a single light beam that passes through all of the quantum well diodes within the respective group.

14. The invention of claim 10 wherein the supplying means comprises a plurality of photodiodes configured in a predetermined arrangement to evaluate a predetermined spatial derivative of an image, the plurality of photodiodes generating the electrical current in response to light from the image.

15. The invention of claim 10 wherein the supplying means comprises a plurality of photodiodes configured in a predetermined arrangement to perform at least one of optical addition and optical subtraction.

16. A method for replicating optical information, the method comprising the steps of:
    converting the optical information into an electrical current; and
    controlling with the electrical current the absorption characteristics of at least two serially connected quantum well diodes so as to modulate the optical power of a plurality of light beams having substantially equal optical power, each light beam passing through a different one of the quantum well diodes, the optical power absorbed from each of the plurality of light beams being proportional to the magnitude of the electrical current.

17. The invention of claim 16 wherein the characteristic of each quantum well diode is such that substantially one photon is absorbed for each electron of current that flows therethrough.

18. A method for amplifying an optical signal, the method comprising the steps of:
    converting the optical signal into an electrical current; and
    controlling with the electrical current the absorption characteristics of at least two serially connected quantum well diodes so as to modulate the optical power of a light beam that passes through all of the quantum well diodes, the optical power absorbed from light beam by each quantum well diode being proportional to the magnitude of the electrical current.

19. The invention of claim 18 wherein the characteristic of each quantum well diode is such that substantially one photon is absorbed for each electron of current that flows therethrough.

20. A method for processing information, the method comprising the steps of:
    representing the information as an electrical current of a predetermined magnitude; and
    controlling with the electrical current the absorption characteristics of two electrically-connected groups of quantum well diodes, the quantum well diodes within each group being electrically connected in series, so as to modulate the optical power of a plurality of light beams having similar optical power, the difference between the optical power absorbed by group of quantum well diodes and the optical power absorbed by the other group of quantum well diodes being proportional to the magnitude of the electrical current.

21. The invention of claim 20 wherein the characteristic of each quantum well diode is such that substantially one photon is absorbed for each electron of current that flows therethrough.

22. The invention of claim 20 further comprising the step of passing a different one of the plurality of light beams through each of the quantum well diodes.

23. The invention of claim 20 further comprising the steps of:
    passing a first one of the plurality of light beams through each of the quantum well diodes in the first group of quantum well diodes; and
    passing a second one of the plurality of light beams through each of the quantum well diodes in the second group of quantum well diodes.

* * * * *